United States Patent [19]

Shuford et al.

[11] 4,375,483

[45] Mar. 1, 1983

[54] FAT COMPOSITION CONTAINING SALT, LECITHIN AND HYDROPHILIC SILICA

[75] Inventors: Charles E. Shuford; Faith D. Clark; Brenda J. Russell, all of Cincinnati, Ohio

[73] Assignee: The Procter & Gamble Company, Cincinnati, Ohio

[21] Appl. No.: 256,278

[22] Filed: Apr. 23, 1981

[51] Int. Cl.$^3$ .......................... A23D 5/00; A23D 5/02
[52] U.S. Cl. ................................ 426/330.6; 426/601; 426/606; 426/613; 426/423
[58] Field of Search ...................... 426/330.6, 601, 607, 426/609, 613, 652, 423, 801, 606

[56] References Cited

U.S. PATENT DOCUMENTS

| | | | |
|---|---|---|---|
| 2,754,213 | 7/1956 | Jones et al. | 426/601 X |
| 3,271,166 | 9/1966 | Van Leeuwen et al. | 426/613 |
| 3,619,213 | 11/1971 | Haynes | 426/423 X |
| 3,669,681 | 6/1972 | Shoaf et al. | 426/601 X |
| 4,044,168 | 8/1977 | Steenhoek et al. | 426/613 |
| 4,188,410 | 2/1980 | Rispoli et al. | 426/652 X |

FOREIGN PATENT DOCUMENTS 7314933 6/1974 Netherlands .

OTHER PUBLICATIONS

Cab-O-Sil, Properties and Functions, Cabot Corp., Tuscola, Ill., Sep., 1974, 36 pp.
21483, Jan. 7, 1981, European Patent Application.
"Aerosil", Fumed Silica, Degussa Corporation, Teterboro, N. J., Oct., 1979, 8 pp.

*Primary Examiner*—Robert A. Yoncoski
*Attorney, Agent, or Firm*—Nancy S. Mayer; Eric W. Guttag; Richard C. Witte

[57] ABSTRACT

A flavor-enhancing fat composition containing salt, lecithin and a hydrophilic fumed silica. The salt provides flavor enhancement and in combination with the lecithin provides a synergistic improvement in the antistick properties of the fat composition. Inclusion of the hydrophilic silica significantly decreases the settling rate of certain particle sizes of salt in the presence of lecithin when the fat is heated and liquefied. The salt remains sufficiently suspended for commercially acceptable periods of time.

23 Claims, 3 Drawing Figures

FAT COMPOSITION CONTAINING SALT, LECITHIN AND HYDROPHILIC SILICA

TECHNICAL FIELD

The present invention relates to a flavor-enhancing fat composition. In particular, the present invention relates to a fat composition containing salt, lecithin and hydrophilic fumed silica.

BACKGROUND ART

The desirability of intensifying the flavor of foods is well known. The most important and best known flavor enhancer is salt. In the case of butter or margarine, the incorporation of salt presents no problem. Butter or margarine contains an aqueous phase in which the salt is dissolved and thus can be uniformly dispersed throughout. However, grilling fats or flavored oils usually contain no water or aqueous phase in which to disperse the salt. Because of the significantly higher density, salt settles out of a liquid fat or oil. In particular, where a container of solid fat, or a fluid fat containing triglyceride hardstock, is heated, the salt settles out of the liquefied fat rapidly.

The uniform delivery of salt from a fat product is particularly desirable in processes where the fat is heated, as in the case of grilling fats and flavored oils. Utilization of butter or margarine to deliver the salt is usually undesirable because the salt remains with the aqueous phase which separates upon heating. The salt-containing aqueous phase cannot be delivered uniformly to the food, particularly in institutional cooking. Additionally, the aqueous phase tends to cause objectionable spattering. Also, butters and margarines burn or brown on continued exposure to high temperatures.

The problem of incorporating salt into a water-free fat composition is described in European Patent Document No. 21,483 to Crosby, published Jan. 7, 1981. The Crosby Patent Document discloses compositions which include a liquefiable fat component and a flavor-enhancing amount of microfine particles of a flavor enhancer such as salt. These microfine particles typically range in size from about 1 to about 10 microns. By controlling the particle size distribution of the microfine particles, a flavor-enhancing suspension of salt can be provided in a liquefied fat for commercially acceptable periods of time.

A component usually included in grilling fats and flavored oils is lecithin. Fried or grilled foods usually stick to cooking utensils and the heated surfaces on which the food is cooked. In particular, grilling fats which contain salt have been found to have poorer anti-sticking performance. The addition of lecithin in suitable amounts improves the anti-sticking performance of the grilling fat. In particular, it has been found that the combination of salt and lecithin synergistically improves anti-sticking performance.

Although the combination of salt and lecithin synergistically improves anti-sticking performance, it has been surprisingly found that lecithin causes the salt to rapidly settle out of the grilling fat when liquefied. Even salt having the microfine particle size disclosed in the Crosby Patent Document quickly settles out of a heated fat containing lecithin within a short period of time.

It is therefore an object of the present invention to provide a flavor-enhancing suspension of salt in the presence of lecithin when the fat is liquefied for commercially acceptable periods of time.

It is a further object of the present invention to provide a fat composition in which particle sizes of salt larger than 1 to 10 microns remain suspended for commercially acceptable periods of time in the liquefied fat, even in the presence of lecithin.

These and other objects of the present invention are described hereinafter.

DISCLOSURE OF THE INVENTION

A. Summary of the Invention

The present application relates to a novel flavor-enhancing fat composition which is substantially free of water or aqueous phase. The composition includes a major amount, i.e. more than about 50% by weight of the composition, of an edible liquefiable fat. This fat preferably comprises a fluid fat containing a particulate suspension of triglyceride hardstock. Usually, the fat comprises at least about 90% by weight of the composition.

The composition further includes a flavor-enhancing amount of salt, and lecithin in an amount effective to reduce sticking. At least about 90% by weight of the salt has a particle size less than about 100 microns. Usually, at least about 50% by weight of the salt has a particle size of from about 1 to about 40 microns in size.

The more rapid settling rate of certain particle sizes of salt in the presence of lecithin is remedied in the present invention by the inclusion of a hydrophilic fumed silica in particulate form. By utilizing a hydrophilic fumed silica, the salt remains sufficiently suspended in the presence of lecithin for commercially acceptable periods of time, e.g. at least about 3 hours, when the fat is heated and liquefied. In particular, the inclusion of hydrophilic fumed silicas permits the suspension of certain larger particle sizes of salt, even in the presence of lecithin.

B. Flavor-Enhancing Composition

1. Fat

As used in the present application, the term "fat" broadly includes all those edible fats or oils which are solid, plastic, or fluid, i.e. pourable or liquid at room temperature, i.e. about 70° F. Generally, the fat must be liquefiable, i.e. liquid, at room temperature or upon heating. Fats which are solid or plastic at room temperature generally melt or liquefy at those temperatures encountered in cooking operations. Most cooking systems utilizing heated fats or oils operate at temperatures of from about 200° to about 500° F. For example, griddling operations utilize temperatures on the order of about 275° to about 400° F. In certain operations, such as deep fat frying, temperatures as high as about 400° F. and above are employed.

Solid or plastic fats which can be utilized in compositions of the present invention are those triglycerides having $C_{12}$ to $C_{22}$ fatty acid moieties. These materials can be derived from plants or animals or can be edible synthetic fats or oils. For example, animal fats such as lard, tallow, oleo oil, oleo stock, oleo stearin and the like, which are solid at room temperature can be utilized. Also, liquid oils, e.g. unsaturated vegetable oils, can be converted into plastic fats by partial hydrogenation of the unsaturated double bonds of the fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See U.S. Pat. No. 3,355,302 to Purves et al., issued Nov. 28, 1967, and U.S. Pat. No. 3,867,556 to Darragh et al., issued Feb. 18, 1975 (herein incorporated by reference), for further examples of solid or plastic fats.

Preferred fats for compositions of the present invention usually comprise fluid fats, i.e. pourable or liquid fats and oils. The term "fluid fat" refers to a triglyceride composition characterized by a fluid or liquid consistency over a normal range of temperatures. Fluid fats have a sufficiently low content of triglycerides of melting point higher than 60° F. as to provide upon cooling of the composition from 100° F. to 60° F., an increase in the amount of solids of not more than about 20%. Such fats will, thus, be fully pourable or liquid at room temperatures and will be appreciated as being fluid.

Fluid fats which can be utilized in compositions of the present invention are known in the art. Examples of such fluid fats and methods for their preparation can be found in U.S. Pat. No. 2,815,285 to Holman et al., issued Dec. 3, 1957, and U.S. Pat. No. 3,595,674 to Shaffer et al., issued July 27, 1971 (herein incorporated by reference). Other fluid fats can, however, be utilized.

A variety of glyceride fat materials can be used for the fluid fat, provided the solids content is such as to provide a fluid character as hereinbefore defined. Liquid glycerides useful herein are edible and comprise primarily triglycerides having $C_{12}$ to $C_{22}$ fatty acid moieties. The fatty acid moieties can be saturated or unsaturated. They can be derived from any of the naturally occurring glyceride oils such as soybean oil, cottonseed oil, peanut oil, rapeseed oil, sesame seed oil, and sunflower seed oil. Also suitable are liquid oil fractions obtained from palm oil, lard, and tallow, as, for example, by graining or directed interesterification followed by separation of the oil.

The fluid fat preferably includes triglycerides having acyl groups predominantly in the range of from 16 to 22 carbon atoms and having a polyunsaturated character. Preferred polyunsaturated triglycerides include those derived from soybeans, cottonseed, peanut, safflower and sunflower seed.

Also suitable for use herein as glyceride fat materials are the so-called low molecular synthetic fats which are certain trior diglycerides in which one or two of the hydroxyl groups of the glycerine have been esterified with acetic, propionic, butyric or caprionic acids and one or two of the remaining hydroxyl groups of the glycerine have been esterified with higher molecular weight fatty acids having from 12 to 22 carbon atoms. Any mixture of the above-enumerated liquid glycerides can be used as the fat material for the fluid fat.

A preferred fluid fat contains a suspension of triglyceride hardstock constituents in particulate form. The hardstock constituent usually amounts to from about 0.5% to about 15% by weight of the fat, preferably from about 2% to about 5% by weight. The hardstock constituent comprises substantially fully hydrogenated normally solid fatty triglyceride, and optionally a normally solid fatty emulsifier. The hardstock constituent ordinarily has an iodine value of less than about 15; preferably, it has an iodine value ranging from about 1 to about 12.

The normally solid fatty triglycerides in the hardstock constituent ordinarily contain in each of their fatty acid moieties from 12 to 22 carbon atoms. The triglyceride hardstock comprises from about 75% to about 100% by weight of beta tending triglyceride and from 0% to about 25% by weight of non-beta tending triglyceride. Preferably, the triglyceride hardstock is all beta tending triglyceride. If the triglyceride hardstock contains non-beta tending triglycerides, the non-beta tending triglyceride usually amounts to about 0.5% by weight of the triglyceride hardstock. The alpha, beta, and beta prime polymorphic shortening phases are described in U.S. Pat. No. 2,521,219 to Holman et al, issued September 5, 1950.

Suitable normally solid triglycerides having strong beta-forming tendencies include, for example, substantially completely hydrogenated triglyceride fats derived from soybean oil, corn oil, hazelnut oil, lard, linseed oil, olive oil, peanut oil, and sunflower seed oil. Substantially completely hydrogenated soybean oil, for example, soybean oil hydrogenated to an iodine value of less than about 10, is a preferred beta-tending triglyceride constituent. In the fluid fat, substantially all of the triglyceride hardstock constituent is present in the beta polymorphic phase. This can be achieved despite the fact that some non-beta tending triglyceride hardstock is utilized as part of the hardstock constituent. The triglyceride hardstock normally has a particle size in the range of from about 1 to about 200 microns, preferably from about 3 to about 100 microns. The presence of the triglyceride hardstock constituent in the beta phase and of all of the hardstock constituent in particulate form allows the successful processing of the hardstock and oil vehicle constituents into a fluid fat having a stable liquid or fluid state.

2. Salt

An important component of the compositions of the present invention is salt. Salt provides a flavor-enhancing benefit to fat compositions, especially in combination with butter flavors. The salt component can comprise sodium chloride, potassium chloride, mixtures of from about 20% to about 80% sodium chloride and about 80 to about 20% potassium chloride, sea salt, as well as mixtures of any of the foregoing ingredients. The salt component often includes iodized salt and anti-caking agents such as tricalcium phosphate. The salt component can comprise substantially all sodium chloride. As used herein, the term "substantially all sodium chloride" refers to a salt component containing at least about 97% by weight sodium chloride.

It is important to the flavor and suspension characteristics of the compositions of the present invention that the salt have a certain particle size. At least about 90% by weight of the salt has a particle size less than about 100 microns. Usually, at least about 50% by weight of the salt has a particle size of from about 1 to about 40 microns. Preferably, at least about 50% by weight of the salt has a particle size of from about 1 to about 20 microns. In an example of a most preferred salt component, at least about 90% by weight of the salt has a particle size of from about 1 to about 10 microns.

The particle size distribution of the salt, i.e. the amount of particles by weight of each particle size, is also controlled to insure a commercially acceptable flavor-enhancing suspension of salt in the fat when liquefied. A particle size distribution which is slanted toward the larger size particles usually requires higher levels of salt, e.g. above about 4%, to provide sufficient flavor impact after the fat is in a liquefied state for several hours. However, higher levels of salt can provide excessive initial flavor impact and large levels of sediment in the bottom portion of the liquefied fat in a short period of time. Representative examples of particle size distributions of salt suitable in compositions of the present invention are presented in the following table:

TABLE I

| Salt | Particle Size (Microns)* | | |
|---|---|---|---|
| | 10th weight Percentile | 50th weight Percentile | 90th weight Percentile |
| 1 | 2.9 | 5.8 | 10.1 |
| 2 | 5.2 | 16.6 | 43.7 |
| 3 | 8.9 | 34.8 | 88.9 |

*largest size of particles in each weight percentile

To provide the proper flavor characteristics, a flavor-enhancing amount of salt is employed in compositions of the present invention. What is "flavor enhancing" depends on various factors such as the particular particle size distribution of the salt used, the type of flavor impact desired, the conditions under which the salt is delivered, etc. Normally, from about 1 to about 4% by weight of the composition can be salt. For fat compositions used as alternatives to butter or margarine, it is preferred that the amount of salt be from about 1.5 to about 3% by weight of the composition.

Salt having a suitable particle size distribution can be obtained by separation from commercial grade salts utilizing air classifiers or similar devices. Preferably, salt of the required particle size is produced by fine grinding, milling or other form of size reduction with or without classification or sieving. Suitable devices for forming salt having the desired particle size are fluid energy or jet mills such as Gem fluid energy mills or Sturtevant Micronizer mills and impact mills such as hammer and pin mills.

3. Lecithin

An important component of compositions of the present invention is lecithin. When foods such as eggs are fried in fats, substantial amounts of the food remain stuck to the pan or grill surface. Lecithin minimizes this sticking in frying and griddling operations. In particular, the combination of lecithin and salt provides a synergistic improvement in anti-stick performance. Lecithin can be derived from a variety of animal and vegetable sources. Suitable vegetable lecithins can be derived from soybean oil, ground nut oil, cottonseed oil and corn oil. From a commercial standpoint, soybean lecithin, i.e. lecithin derived from soybean oil, is preferred.

Lecithin is included in an amount effective to reduce sticking. The amount of lecithin is at least about 0.05 by weight of the composition. Usually, the amount of lecithin included is from about 0.1 to about 0.5% by weight. Lecithin at a level of about 0.3% or higher by weight can cause noticeable darkening of the fat when heated. Preferably, lecithin is included in an amount of from about 0.1 to about 0.2% by weight.

4. Hydrophilic fumed silicas

A particularly important component of compositions of the present invention is the hydrophilic fumed silica. It has been found that the more rapid settling rate of certain particle sizes of salt in the presence of lecithin is remedied by the inclusion of these silicas. The result is that suitable flavor-enhancing suspensions of salt are provided in heated or liquefied fats for commercially acceptable periods of time. In particular, it has been found that the inclusion of these silicas permits the use of certain larger particle sizes of salt in heated or liquefied fats. These larger particle size salts also remain suspended in the presence of lecithin for commercially acceptable periods of time.

Hydrophilic fumed silicas used in the present invention are usually produced by the hydrolysis of silicon tetrachloride vapor in a flame of hydrogen and oxygen. These silicas are referred to as "fumed" silicas because of the smokelike appearance of the silica in the flame during manufacture. The term "pyrogenic" silica is another name used for fumed silicas. Fumed silicas have a fine, particulate form and are usually composed of aggregates of many smaller particles which have been fused together. During the formation of fumed silicas, hydroxyl groups become attached to some of the silicon atoms on the particle surface. These hydroxyl groups render the silica surface hydrophilic and capable of hydrogen bonding.

The average diameter of the particles of fumed silica typically ranges from about 0.007 to about 0.016 microns. The average surface area of the fumed silica particles typically ranges from about 130 to about 400 m.$^2$/g. Suitable fumed silicas which can be used in the present invention are sold under the names "Cab-O-Sil", manufactured by Cabot Corporation, or "Aerosil", manufactured by Degussa. The following table gives the characteristics of Cab-O-Sil ® and Aerosil hydrophilic fumed silicas suitable for use in the present invention:

TABLE II

| Type | Surface Area* (m.$^2$/g.) | Density | pH (4% in. H$_2$O) | Particle Size** (microns) |
|---|---|---|---|---|
| Cab-O-Sil | | (lbs./ft.$^3$) | | |
| M-5 | 200 (±25) | 2.3 (max.) | 3.5–4.2 | .014 |
| MS-7 | 200 (±25) | 4.5 (±0.5) | 3.6–4.2 | .014 |
| MS-75 | 255 (±15) | 4.5 (±0.5) | 3.6–4.2 | .011 |
| HS-5 | 325 (±25) | 2.3 (max.) | 3.6–4.2 | .008 |
| EH-5 | 390 (±40) | 2.3 (max.) | 3.5–4.2 | .007 |
| S-17 | 400 (±20) | 4.5 (±0.5) | 3.6–4.0 | .007 |
| Aerosil | | (g./l) | | |
| 130 | 130 (±25) | 50 | 3.6–4.3 | .016 |
| 150 | 150 (±15) | 50 | 3.6–4.3 | .014 |
| 200 | 200 (±25) | 50 | 3.6–4.3 | .012 |
| 300 | 300 (±30) | 50 | 3.6–4.3 | .007 |
| 380 | 380 (±30) | 50 | 3.6–4.3 | .007 |

*Surface area measured by nitrogen adsorption method of Brunauer et al, J. Am. Chem. Soc., 60, 309 (1938)
**Calculated from surface area assuming sphericity of particles.

The amount of hydrophilic fumed silica included in compositions of the present invention is at least about 0.5% by weight of the salt. An amount of fumed silica of from about 1 to about 2% by weight of the salt provides suitable salt suspension characteristics in the presence of lecithin. Increasing the amount of hydrophilic fumed silica up to at least about 10% by weight of the salt can provide some additional improvement in salt suspension. Even within these ranges, the hydrophilic fumed silicas improve the suspension characteristics of only certain particle size distributions of salt in the presence of lecithin. For example, inclusion of Cab-O-Sil ® EH-5 in an amount of about 2% by weight of the salt has been found to significantly improve the suspension characteristics of type 1, 2 and 3 salts, previously described in Table I.

By contrast, Cab-O-Sil ® EH-5 in the same amount has been found to minimally improve, if at all, the suspension characteristics of the following particle size distribution of salt:

TABLE III

| Salt | Particle Size (Microns)* | | |
|---|---|---|---|
| | 10th weight Percentile | 50th weight Percentile | 90th weight Percentile |
| 4 | 74 | 125 | 160 |

*largest size of particles in each weight percentile

By the inclusion of hydrophilic fumed silicas, flavor-enhancing suspensions of salt having certain particle size distributions can be provided in heated or liquefied fats containing lecithin for a commercially acceptable period of time. As used herein, a "commercially acceptable period of time" is defined as a time period of at least about 3 hours, and preferably at least about 4 hours, after liquefication of the fat. Although longer suspension times are preferred, a 3-hour time period for suspension of the salt is usually sufficient for most commercial operations where heated fats are used.

It is desirable that at least about 0.5% of the salt by weight of the composition remain suspended in the liquefied fat for commercially acceptable periods of time. From panel testing with scrambled eggs, the food most often cooked in grilling fats, it has been determined that a level of at least about 0.5% salt in the fat is the threshold limit which can be detected by a majority of consumers. It should be understood, however, that, in other food applications, lower levels of salt can be detected.

5. Other optional ingredients and water content

Compositions of the present invention can comprise any of a variety of optional additive materials commonly employed in edible fats. Thus, for example, compositions of the present invention can contain emulsifiers, such as mono- and diglyceride emulsifiers, colorants, antioxidants or antifoamants, such as the dimethyl polysiloxanes. Compositions of the present invention are preferably buttery flavored, e.g. flavored with the lower alkyl carboxylic acids, methyl ketones, lactones, diketones (diacetyl) and like compounds well known in the art.

Compositions of the present invention usually contain major amounts of long chain triglycerides having acyl groups of from 16 to 22 carbon atoms. These long chain triglycerides have an increased gumming tendency when applied to heated surfaces, e.g. the composition forms gum or varnish-like deposits on the cooking surface. Lecithin also causes the formation of such gum or varnish-like deposits.

It is often desirable to add a short chain triglyceride having acyl groups predominantly in the range of from 8 to 14 carbon atoms in an amount effective to reduce the gumming tendencies of the long chain triglycerides and lecithin. Such short chain triglycerides are added in amounts ranging from about 0.05% to about 10% by weight of the composition. A preferred amount of the short chain triglyceride is from about 0.1% to about 5% by weight. A preferred short chain triglyceride is coconut oil which predominates in acyl groups of from 12 to 14 carbon atoms. Other short chain triglycerides having an appreciable content of acyl groups of from 8 to 14 carbon atoms can likewise by employed. Examples include palm kernel oil, babassu oil, and myristic acid triglycerides. See British Patent Document No. 2,006,810 to Crosby, published May 10, 1979.

Because salt is water soluble, compositions of the present invention are substantially water-free. Compositions of the present invention can comprise low water content margarines wherein the aqueous phase formed is insufficient to dissolve an appreciable amount of the salt, i.e. water forms less than about 5% by weight of the composition. Preferably, the water content is on the order of about 2% or less, preferably about 0.1% or less by weight of the composition as in the case of grilling fats. Usually, the water content does not exceed 3 parts by weight per 1 part by weight salt.

C. Uses of and Methods for Making Fat Compositions

The fat compositions of the present invention have various applications where it is desirable to deliver salt to food. For example, compositions of the present invention can be used in baking, griddling, broiling, frying, bun machine operations, deep fat frying or the like. Also, compositions of the present invention can be used in the preparation of eggs, such as scrambled eggs, seafood, bread, cookies, potatoes such as hash browns, broiled fish, sauces for vegetables or similar foods. Further, fluid fat compositions containing triglyceride hardstock can be utilized as alternatives to butter in applications such as spread usage on toast.

A number of methods can be utilized for preparing compositions according to the present invention. One method is to add the salt, lecithin and hydrophilic fumed silica directly to the fat. These three ingredients are mixed or stirred to give a substantially uniform dispersion. The salt should be mixed or dispersed in such a way as to prevent agglomeration of the salt into larger masses. The hydrophilic fumed silica is usually added as a mixture with the salt. However, inclusion of the hydrophilic silica separate from the salt gives similar results from the standpoint of salt suspension.

For preferred salt suspension characteristics, it is important that the hydrophilic fumed silica be unground before addition to the composition and remain unground thereafter. For example, a mixture of salt and silica which has been ground and then added to the composition does not have salt suspension characteristics as good as a mixture of salt and unground silica.

Various types of mixers can be employed for uniformly dispersing the salt, lecithin and hydrophilic fumed silica in the fat. For example, the mixer can be a planetary paddle mixer, a sigma mixer, a ribbon blender, a twin paddle mixer, a Hobart ® mixer, and other well-known mixers such as Omni and Eppenbach mixers.

A desirable method for making fat compositions of the present invention is as follows. First, the salt, lecithin and hydrophilic silica is added to a liquid fat or oil and mixed well to form a concentrate. Next, the concentrate is passed through a high shear mixer, blended with the remainder of the fat and mixed to uniformly disperse the concentrate throughout. The foregoing method has been found to be the best for avoiding salt agglomeration problems.

COMPARISON OF THE SALT SETTLING RATE OF HEATED EDIBLE FAT COMPOSITIONS

Figure 1:
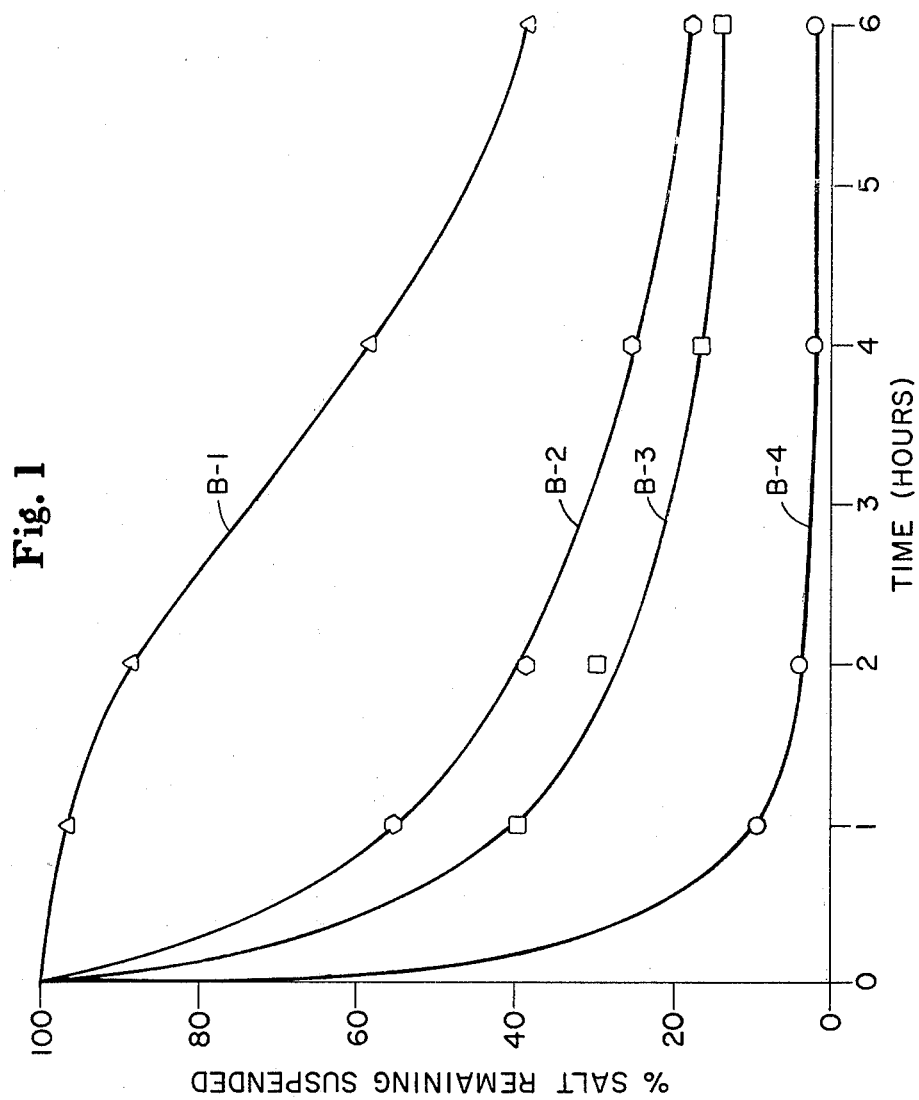
FIG. 1 shows salt settling curves for heated fluid fat compositions which contain salt only.

Example 1 a. Composition preparation and testing

The salt settling rate of heated fluid fat compositions which contained salt (B), salt and lecithin (L), and salt, lecithin and hydrophilic fumed silicas (C) were compared. Four different particle size distributions of the salt were used in making the fat compositions and are presented in the following table:

TABLE IV

| Salt | Particle Size (Microns)* | | |
|---|---|---|---|
| | 10th weight Percentile | 50th weight Percentile | 90th weight Percentile |
| 1 | 2.9 | 5.8 | 10.1 |
| 2 | 5.2 | 16.6 | 43.7 |
| 3 | 8.9 | 34.8 | 88.9 |
| 4 | 74 | 125 | 160 |

*largest size of particles in each weight percentile

For each fat composition, a 30% salt concentrate was formed by mixing salt and soybean oil of iodine value 107, plus lecithin and Cab-O-Sil ® EH-5 when appropriate, in an Eppenbach high shear mixer for 4 minutes. The salt concentrates were blended with a base fat containing 96.2% soybean oil of iodine value 107 and 3.8% by weight soybean hardstock of a maximum iodine value of 8 in a Lightnin ® mixer to form fluid fat compositions containing about 2% by weight salt. About 0.125% by weight lecithin and about 0.04% by weight (about 2% by weight of salt) of Cab-O-Sil ® EH-5 was present in the appropriate fluid fat compositions. Mixing was continued for a period of time sufficient to thoroughly disperse the ingredients without incorporating air.

Each fat composition was tested in duplicate 5-quart cans which were 9½" high and 6½" in diameter. The fat compositions had an initial temperature of 70°–80° F. and were placed on a grill surface preheated to a temperature of 325° F. After melting, the temperature throughout the fat composition in each can was controlled to within 150°–180° F. by varying the temperature of the grill surface. It was estimated that each fat composition was completely liquefied after 1 hour.

The percent salt suspended by weight of the total fat composition at 1, 2, 4 and 6 hours is presented in the following table (each point represents the average of two samples, one being taken from each can):

TABLE V

| Composition | % Salt Suspended | | | | |
|---|---|---|---|---|---|
| | Initial | 1 Hr. | 2 Hr. | 4 Hr. | 6 Hr. |
| B-1 | 1.91 | 1.85 | 1.69 | 1.11 | 0.75 |
| B-2 | 1.96 | 1.01* | 0.70 | 0.50 | 0.33 |
| B-3 | 1.95 | 0.77 | 0.57 | 0.31 | 0.25 |
| B-4 | 1.94 | 0.17 | 0.07 | 0.04 | 0.04 |
| L-1 | 1.93 | 1.16 | 0.92 | 0.28 | 0.11 |
| L-2 | 1.94 | 1.07 | 0.47 | 0.11 | 0.05 |
| L-3 | 1.91 | 0.71 | 0.32 | 0.12 | 0.05 |
| L-4 | 1.87 | 0.28 | 0.06 | 0.04 | 0.02 |
| C-1 | 1.93 | 1.81 | 1.81 | 1.37 | 1.12 |
| C-2 | 1.93 | 1.13 | 1.06 | 0.73 | 0.53 |
| C-3 | 1.91 | 0.75 | 0.72 | 0.46 | 0.35 |
| C-4 | 1.90 | 0.24 | 0.10 | 0.06 | 0.05 |

*average of 4 samples, two from each can
B - salt
L - salt and lecithin
C - salt, lecithin and Cab-O-Sil ® EH-5
Subscripts 1, 2, 3 and 4 refer to type of salt from Table IV The data presented in Table V was used to calculate the percentage of the original salt remaining suspended in the fat and is presented in the following table:

TABLE VI

| Composition | % of Original Salt Remaining Suspended | | | |
|---|---|---|---|---|
| | 1 Hr. | 2 Hr. | 4 Hr. | 6 Hr. |
| B-1 | 96.9 | 88.5 | 58.1 | 39.3 |
| B-2 | 55.5 | 35.7 | 25.5 | 16.8 |
| B-3 | 39.5 | 29.2 | 15.9 | 12.8 |
| B-4 | 8.8 | 3.6 | 2.1 | 1.8 |
| L-1 | 60.0 | 47.7 | 14.5 | 5.7 |
| L-2 | 55.2 | 24.2 | 5.7 | 2.6 |
| L-3 | 37.1 | 16.8 | 6.3 | 2.6 |
| L-4 | 15.0 | 3.2 | 2.1 | 1.1 |
| C-1 | 93.8 | 93.8 | 71.0 | 58.0 |
| C-2 | 58.5 | 54.9 | 37.8 | 27.5 |
| C-3 | 39.3 | 37.7 | 24.1 | 18.3 |
| C-4 | 12.6 | 5.3 | 3.2 | 2.6 |

Figure 2:
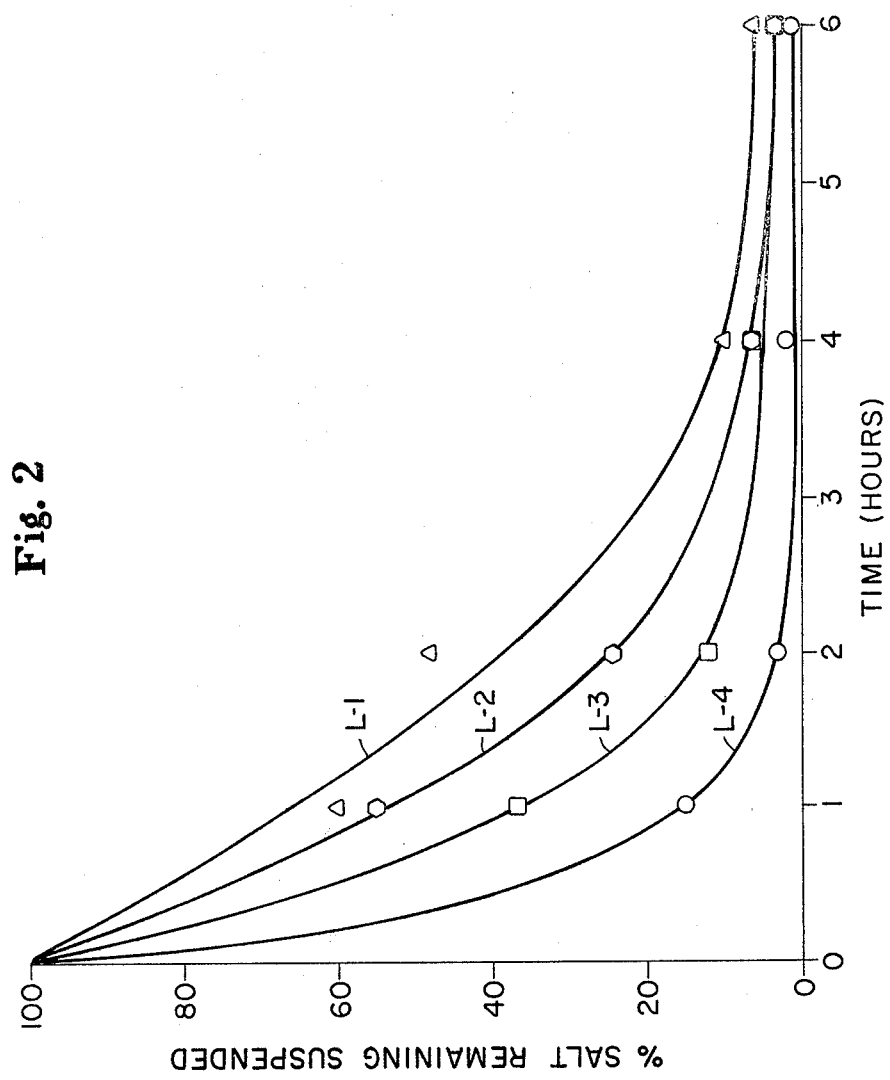
FIG. 2 shows salt settling curves for heated fluid fat compositions which contain salt and lecithin.
Figure 3:
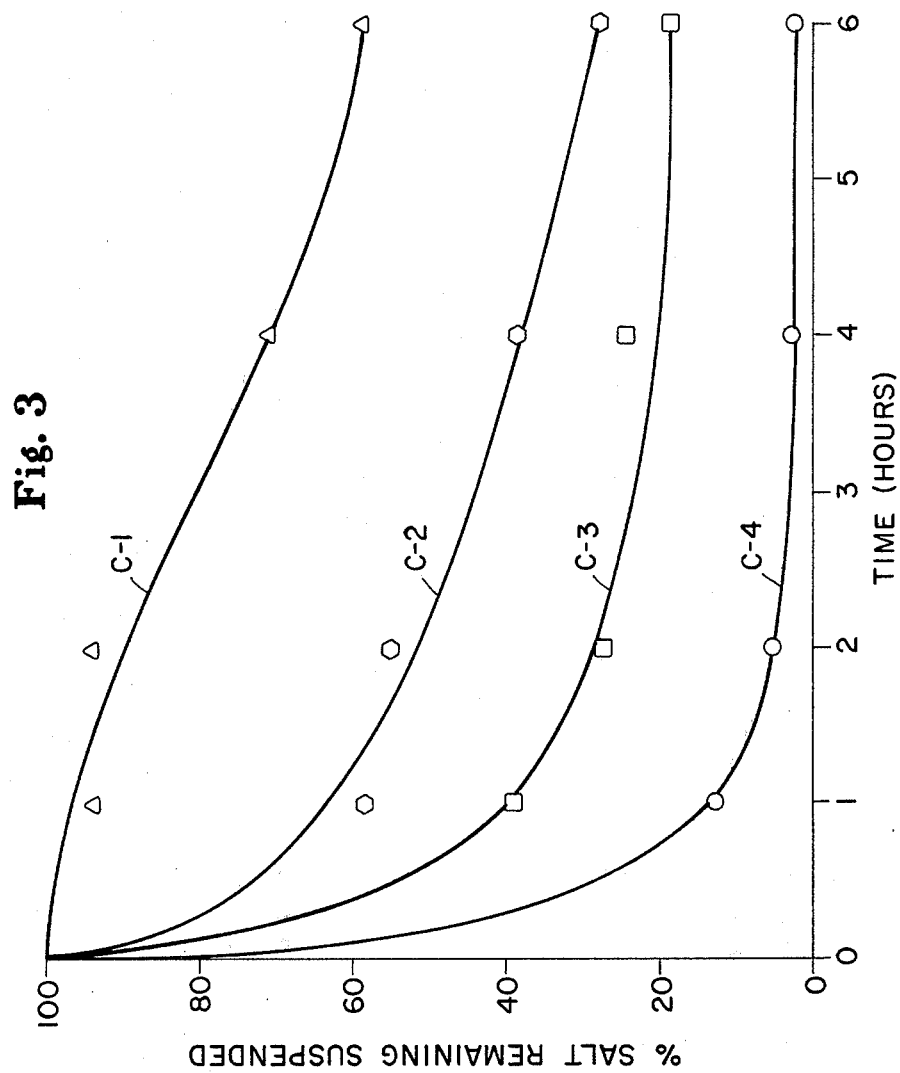
FIG. 3 shows salt settling curves for heated fluid fat compositions which contain salt, lecithin and hydrophilic fumed silicas.

The data presented in Table VI is graphically portrayed in FIGS. 1, 2 and 3 as a series of salt settling curves. A comparison of the salt settling curves of FIG. 1 (salt only) with those of FIG. 2 (salt and lecithin) demonstrates that lecithin significantly *increases* the settling rate of type 1, 2 and 3 salt, especially at the 4 hour mark (about 3 hours after liquefication of the fat) so that the salt does not remain sufficiently suspended for a commercially acceptable period of time. A comparison of the salt settling curves of FIG. 3 (salt, lecithin and Cab-O-Sil ® EH-5) with those of FIG. 2 (salt and lecithin) demonstrate that CAb-O-Sil ®EH-5 significantly *decreased* the salt settling rate of type 1, 2 and 3 salt in the presence of lecithin, especially at the 4 hour mark, so that the salt remains sufficiently suspended. Indeed, a comparison of the salt settling curves of FIG. 1 with those of FIG. 3 show that inclusion of Cab-O-Sil ® EH-5 significantly decreased the salt settling rate for type 1, 2 and 3 salt relative to salt alone, especially at the 4 hour mark, so that larger particle size salts such as type 3 have acceptable suspension characteristics. A comparison of the salt settling curves for type 4 salt (FIG. 1, 2 and 3) show minimal differences in the salt settling rates.

b. Analysis (1) Particle Size Distribution of Salt

The particle size distribution of the type 1, 2 and 3 salt was determined by a Leeds and Northrup Microtrac particle size analyzer. A bulk sample of the salt was circulated through the optical path of a helium-neon laser. An optical masking system analyzed the low-angle, forward scattered light (Fraunhofer diffraction) from the salt particle stream. A microprocessor controlled the analyzer, gathered the data, and calculated the various particle size distributions which were outputted to a printer. The analyzer was used in conjunction with a Leeds and Northrup dry powder sample conditioner which permitted the bulk salt sample to undergo a mild de-agglomeration before analysis. Final measurements were taken of the bulk sample after a steady state situation was reached, as measured by the median (50% by weight) particle size distribution. The particle size distribution of the type 4 salt was determined by a sieve analysis presented in the following table:

TABLE VII

| Screen Size (U.S. Mesh) | Screen Size (Microns) | % on Screen (by Weight) |
|---|---|---|
| 100 | 149 | 24.5 |
| 140 | 105 | 42.0 |
| 200 | 74 | 15.5 |
| 270 | 53 | 15.9 |
| 325 | 44 | 1.2 |
| 400 | 37 | 0.5 |
| pan | — | 0.4 |

(2) Salt Content of Fat

Each fat composition was tested for salt content at 1, 2, 4 and 6 hours by using 25 ml. pipettes to take 25 ml. samples from the radial center of the can at a depth of 1 inch from the top of the fat level. A portion of each sample (3–5 g.) was then extracted in boiling water to partition the salt into the aqueous phase. The salt-containing aqueous phase was titrated with 0.1 N silver nitrate to a potentiometric end point as measured by a silver-silver chloride electrode. The end point was determined by comparing the voltage difference between the salt-containing aqueous phase solution and a silver nitrate reference solution. A further discussion of the chemistry and detection system of this potentiometric technique can be found in Callan and Harrovian, *Journal of the Society of Chemical Engineers*, 329T-343T (1928).

EXAMPLE 2

The salt settling rate of heated fluid fat compositions containing hydrophilic fumed silicas and silica gels were compared. The fluid fat compositions were formulated similar to Example 1. Each fat composition contained about 2% salt, 0.125% lecithin and 0.04% of the particular silica (2% by weight of the salt). Each of the fat compositions was tested under conditions similar to Example 1. The hydrophilic fumed silicas tested were Cab-O-Sil ® EH-5 and M-5. The silica gels tested were Syloid ® 244 and 266.

The percentage of the original salt remaining suspended in each of the fat compositions is presented in the following table:

TABLE VIII

| Silica | % of Original Salt Remaining Suspended | | | |
|---|---|---|---|---|
| | Salt* | 2 Hrs. | 4 Hrs. | 6 Hrs. |
| Cab-O-Sil EH-5 | 1 | 82 | 75 | 72 |
| Cab-O-Sil M-5 | 1 | 58 | 56 | 46 |
| Syloid 244 | 1 | 56 | 36 | 25 |
| Syloid 266 | 1 | 59 | 36 | 22 |
| Cab-O-Sil EH-5 | 2 | 58 | 46 | 36 |
| Cab-O-Sil M-5 | 2 | 49 | 42 | 25 |
| Syloid 244 | 2 | 51 | 25 | 13 |
| Syloid 266 | 2 | 38 | 20 | 16 |

*similar to type 1 and 2 salt of Table IV

As can be seen from Table VIII, the salt settling rate of the fat compositions containing Cab-O-Sil ® EH-5 or M-5 was significantly lower than that of the fat compositions containing Syloid ® 244 or 266.

What is claimed is:

1. A flavor-enhancing fat composition, which comprises:
   (a) a major amount of an edible liquid fat;
   (b) a heat stable suspension of a flavor-enhancing amount of dispersed salt, at least about 90% by weight of said salt having a particle size less than about 100 microns;
   (c) lecithin in an amount of at least about 0.05% by weight of the composition; and
   (d) a hydrophilic fumed silica in particulate form in an amount of at least about 0.5% by weight of said salt.

2. A composition according to claim 1 wherein said fat comprises at least about 90% by weight of the composition.

3. A composition according to claim 2 wherein said salt comprises from about 1% to about 4% by weight of the composition.

4. A composition according to claim 3 wherein at least 24% by weight of salt is substantially uniformly dispersed in suspension in said fat after heating for 3 hours.

5. A composition according to claim 3 wherein at least about 50% by weight of said salt has a particle size of from about 1 to about 40 microns.

6. A composition according to claim 5 wherein at least about 50 % by weight of said salt has a particle size of from about 1 to about 20 microns.

7. A composition according to claim 6 wherein said salt comprises sodium chloride, potassium chloride or mixtures thereof.

8. A composition according to claim 6 wherein said salt comprises substantially all sodium chloride.

9. A composition according to claim 3 wherein said salt comprises from about 1.5 to about 3% by weight of the composition.

10. A composition according to claim 9 wherein at least about 90% by weight of said salt has a particle size of from about 1 to about 10 microns.

11. A composition according to claim 3 wherein said silica comprises from about 1 to about 2% by weight of said salt.

12. A composition according to claim 11 wherein said silica comprises particles having an average surface area of from about 130 to about 400 m.²/g.

13. A composition according to claim 3 wherein said liquid fat has a particulate suspension of from about 0.5% to about 15% by weight triglyceride hardstock.

14. A composition according to claim 13 wherein said liquid fat has from about 2% to about 5% by weight triglyceride hardstock.

15. A composition according to claim 14 wherein said salt comprises from about 1.5 to about 3% by weight of the composition.

16. A composition according to claim 15 wherein at least about 50% of said salt by weight has a particle size of from about 1 to about 20 microns.

17. A composition according to claim 3 wherein said lecithin comprises from about 0.1 to about 0.5% by weight of the composition.

18. A composition according to claim 17 wherein said lecithin comprises soybean lecithin.

19. A composition according to claim 18 wherein said lecithin comprises from about 0.1 to about 0.2% by weight of the composition.

20. A flavor-enhancing fat composition, which comprises:

(a) an edible liquid fat in an amount of at least about 90% by weight of the composition;
(b) a heat-stable suspension of dispersed salt comprising sodium chloride in an amount of from about 1.5 to about 3% by weight of the composition, at least about 90% of said salt by weight having a particle size less than about 100 microns, and at least about 50% of said salt by weight having a particle size of from about 1 to about 40 microns;
(c) soybean lecithin in an amount of from about 0.1 to about 0.5% by weight of the composition; and
(d) a hydrophilic fumed silica having particles with an average surface area of from about 130 to about 400 m.$^2$/g. and being in an amount of from about 1 to about 2% by weight of said salt.

21. A composition according to claim 20 wherein said fat comprises a liquid fat having from about 2% to about 5% by weight triglyceride hardstock.

22. A method for providing a flavor-enhancing liquid fat composition which contains a major amount of an edible liquefiable fat, a heat-stable suspension of a flavor-enhancing amount of dispersed salt, at least about 90% by weight of the salt having a particle size less than about 100 microns, and lecithin in an amount of at least about 0.05% by weight of the composition, said method comprising the steps of:
(a) adding to the composition a hydrophilic fumed silica in particulate form in an amount of at least about 0.5% by weight of the salt; and
(b) mixing the composition to provide a substantially uniform dispersion of the salt, lecithin and silica in the fat.

23. A method for providing a flavor-enhancing liquid fat composition which contains an edible liquefiable fat in an amount of at least about 90% by weight of the composition, a heat-stable suspension of dispersed salt in an amount of from about 1.5 to about 3% by weight of the composition, at least about 50% by weight of the salt having a particle size of from about 1 to about 40 microns, and lecithin in an amount of from about 0.1 to about 0.5% by weight of the composition, said method comprising the steps of:
(a) adding to the composition a hydrophilic fumed silica having particles with an average surface area of from about 130 to about 400 m.$^2$/g. and being in an amount of from about 1 to about 2% by weight of the salt; and
(b) mixing the composition to substantially uniformly disperse the salt, lecithin and silica in the fat.

* * * * *